Figure 6:
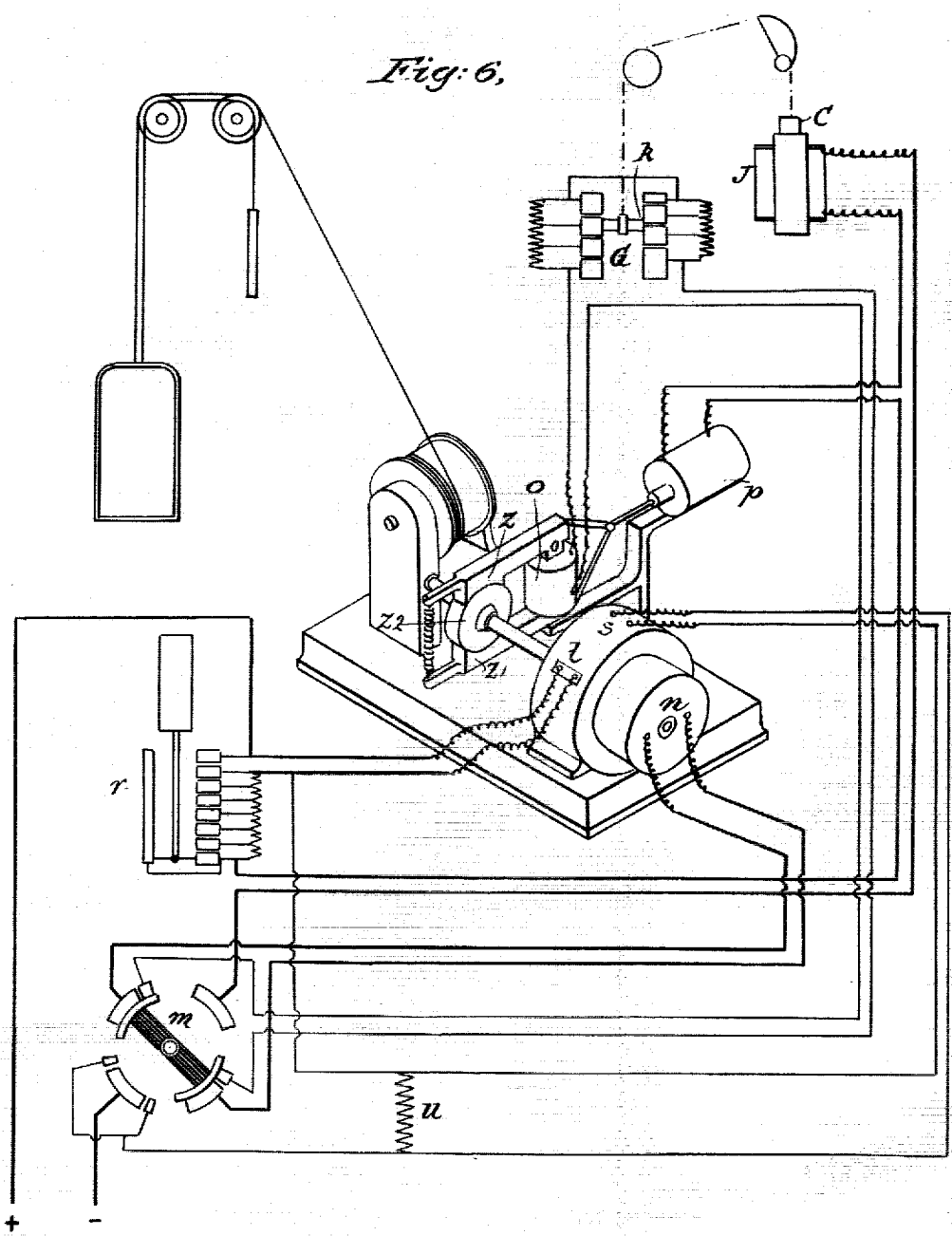

No. 853,585. PATENTED MAY 14, 1907.
F. O. HUNT.
CONTROLLING DEVICE FOR ELECTRICALLY DRIVEN MACHINERY.
APPLICATION FILED FEB. 28, 1906.
3 SHEETS—SHEET 1.
Fig. 1,
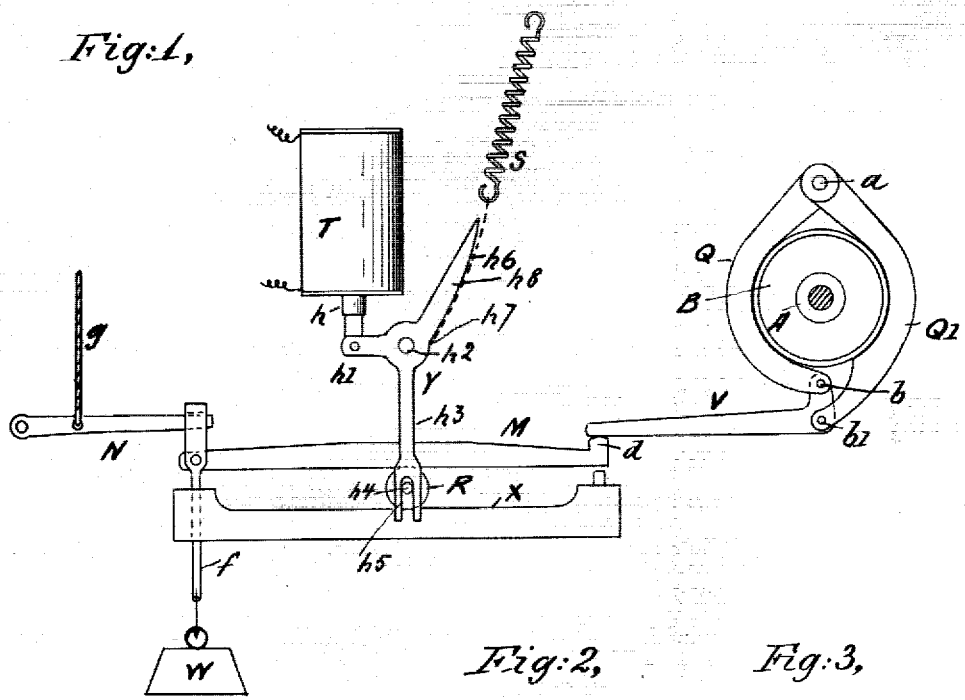
Fig. 2, Fig. 3,
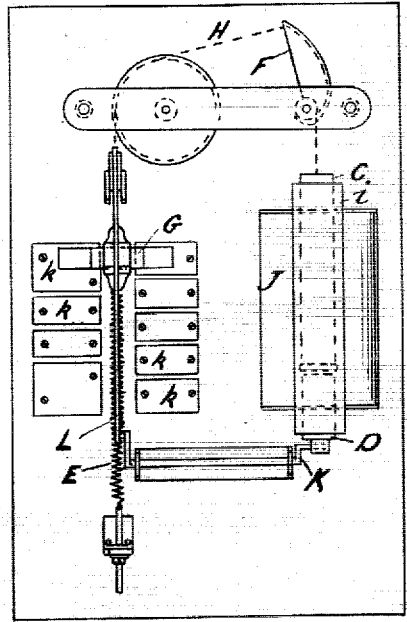 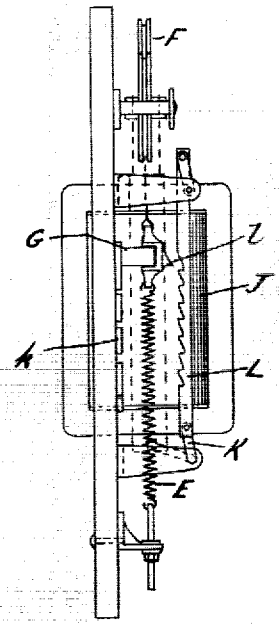
Attest:
Ernst H. Hagin
F. A. Stewart
Inventor:
Frederic O. Hunt,
by Edgar Tate & Co. Attys No. 853,585. PATENTED MAY 14, 1907.
F. O. HUNT.
CONTROLLING DEVICE FOR ELECTRICALLY DRIVEN MACHINERY.
APPLICATION FILED FEB. 28, 1906.
3 SHEETS—SHEET 2.
Fig. 4,
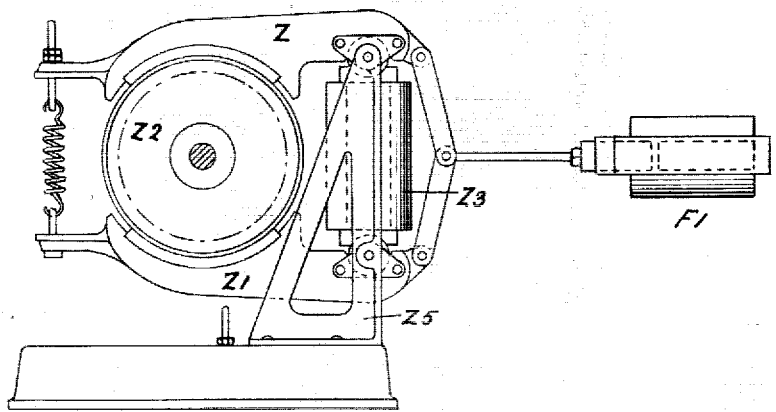
Fig. 5,
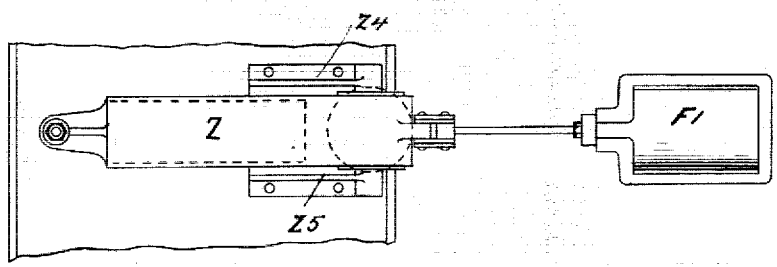
Attest:
Inventor:
Frederic O. Hunt,
by Edgar Tate & Co Atty's.

UNITED STATES PATENT OFFICE.

FREDERIC OSMOND HUNT, OF DARLINGTON, ENGLAND.

CONTROLLING DEVICE FOR ELECTRICALLY-DRIVEN MACHINERY.

No. 853,585.     Specification of Letters Patent.     Patented May 14, 1907.

Application filed February 28, 1906. Serial No. 303,340.

*To all whom it may concern:*

Be it known that I, FREDERIC OSMOND HUNT, a subject of the King of Great Britain, and residing at Darlington, in the county of Durham, England, have invented certain new and useful Improvements in Controlling Devices for Electrically-Driven Machinery, of which the following is a specification, such as will enable those skilled in the art to which it appertains to make and use the same.

This invention relates to controlling devices for electric motors and is especially applicable to the control of electrically operated elevators, cranes or similar machines, and the object of the same is to provide means for automatically stopping the elevator car or similar object under varying loads at any desired level after cutting off power. In high speed lifts and in those automatically controlled by push button arrangements there is considerable alteration in the length of free run after power is cut off, owing to differences in load and also according to whether the load is ascending or descending.

The main object of this invention is to provide a means of varying the braking effort inversely as the torque required for the motor, to keep the load in motion, and thereby make the elevator always come to rest in the same range of travel after cutting off power.

The amount of turning effort exerted by an electric motor, having a constant field strength, is measured by the current passing through its armature, and where the field strength is not constant the effect is in the same direction and more or less in the same proportion. Therefore I insert in the power supply circuit, preferably in that carrying current to the armature only, an apparatus of the nature of an ammeter, preferably of the moving coil or moving iron type. This apparatus being provided with a fluid friction or an electric magnetic retarding device and in some cases, a clamp mechanism, which holds the moving part stationary as soon as the current is cut off, gives an indication of the current which was passing through it just before the current was interrupted and therefore of the turning effort which was being exerted by the motor. Instead of adapting such ammeter apparatus to be read by the eye of the attendant, I cause it to modify the force, applied to stop the motion of the machinery.

The accompanying drawings illustrate diagrammatically my invention in which;—Figure 1 illustrates my ammeter apparatus where the braking is of purely mechanical character and where suitably formed levers are designed to adjust the amount of spring or dead weight pressure applied to the brake shoes; Figs. 2 and 3 show one form of resistance regulator which forms part of my device in applying the method of modification of braking effect to the electro-dynamic method of braking; Figs. 4 and 5 illustrate an electro magnetic braking device; and, Fig. 6 illustrates a diagrammatic general view of an elevator mechanism with brake regulator connected therewith and embodying the features as separately illustrated in Figs. 2 and 4.

Referring to Fig. 1 which illustrates my ammeter apparatus designed to adjust the spring or dead weight pressure applied to the brake shoes, T is a solenoid through which the current passes to the motor armature. This solenoid together with the control spring S and the three arm lever Y forms the ammeter portion of the regulator, the position of the lever Y evidently depending upon the strength of the current in the armature circuit. W represents the force, either spring or dead weight, which through the medium of the levers M and V, applies the brake shoes Q, Q¹ to the pulley B on the shaft A. N is the end of the lever by which the hand rod *g* causes the brake to be released when the motor is required to work. Thus when the motor is actually running the lever M will be lifted clear off the roller R which at other times acts as fulcrum for the lever M, the roller R is thus free to be adjusted by the lever Y in accordance with the current in the solenoid T. This adjustment of the fulcrum is such that if the load and direction of motion have been such as to require a great current to keep the load in motion, the force applied to stop it by the brake will be small, and if the current required has been small the braking force will be great. I, however, prefer to apply the method of modification of braking effect to the electro-dynamic method of braking, as in this case the whole of the modification of retarding forces can be carried out by causing the ammeter apparatus to move the contact maker of a rheostat switch which varies the resistance in the circuit through which the motor acting as a dynamo, is caused to send the current. Figs. 2 and 3 show one form of such a resistance regulator. A solenoid coil J, provided with two plungers C and D constitute the current measuring part of the device. The magnetic pull on plunger C is balanced against that of the spring E, the cam F intervening in the transmission chain H, in order to correct for the variation of pull on the plunger, according to its position. The contact maker G is attached to the transmission chain H and is thereby moved over the contacts k—k to which the rheostat of the braking circuit is attached. The current through the motor armature, when driving the lifting machinery, passes through the coil J and raises the contact maker G more or less according to the current required to operate the machinery. The tube in which the plunger C D works is divided into two compartments and the upper one with its plunger C is made to act as a dash-pot in order that the movements of the contact maker G may be comparatively slow. The plunger D is capable of prompt movement and by means of the crank K operates the locking bar L so that as soon as the current is cut off from the coil J the fall of the plunger D brings locking bar L into action and stops the further downward motion of the contact maker G, which is thus clamped at whatever place it happens to be in accordance with the current which was required to keep the load in motion. The contact maker G is pressed into intimate contact with the plates k—k, thus including in the braking circuit the appropriate amount of resistance to cause the machinery to be stopped in the prescribed distance of travel. In some cases it may be desirable to cause the locking bar L to be brought into action by a pull of an electro magnet or solenoid connected with the braking circuit.

To extend the scope of the electro dynamic method of braking and also cause a more comfortable stoppage, I not only cause the motor to be retarded by producing current in the braking circuit, but I cause the current, so obtained, to pass through the coils of an electro magnet of which the brake shoes form the pole pieces, thereby obtaining the further braking effect of increased grip on the iron brake pulley, but also the retarding effect due to eddy-currents produced in the brake pulley by virtue of the fact that it rotates in a magnetic field. Figs. 4 and 5 show one form of such an electro magnetic brake in which Z—Z¹ are the pole pieces which act as brake shoes on the pulleys Z². The current in the braking circuit flows through the coil 23 and energizes the pole pieces Z—Z¹ which act as a field magnet, while the pulley Z² acts as the armature of a dynamo while the stopping of the machinery is being accomplished. The parts of the brake mechanism are held together by brackets Z⁵ of non-magnetic material. F¹ is a solenoid which is connected to the power supply circuit when the motor is being started, and lifts the brake shoes clear off the pulley in the usual way, while the motor is driving the machinery. This solenoid F¹ may in some cases be combined with the regulating device so as to take the place of the solenoid used therein. In some cases it may be advisable to put windings on the pulley to form paths for the eddy currents in the same manner as is commonly done upon the rotors of polyphase machinery. Where alternating currents are to be used for driving the machinery similar arrangements can be made but it is necessary also to make such modification of the motor itself so as to allow the device being used as a self exciting generator.

In Fig. 6 an extended diagrammatic view illustrates the circuits uniting the various features which represent my preferred form of brake regulating device applied to an elevator hoisting apparatus. A reversing switch m is shown in the off-position, prior to the brake coming into action. In this position the switch m connects the armature terminals n to the resistance of the brake regulator at G. The position of this regulator G has been determined during the running of the car which is supposed to be now ceasing. The position of this contact at k is determined by that of the plunger C in the coil J. It will be noted that this coil J is included in the circuit which supplies current to the armature when the car is running, therefore the position of the contact maker at J may be said to depend upon the value of the current required to move the load, and it will be seen that when the current is great the contact moves in such a way as to include as much resistance as possible in the armature circuit during the period of applying the brake. As the motor is during that time acting as dynamo and thus contributing to the braking effect, the result of including a maximum amount of resistance will be, to make the dynamic action of the motor, when stopping a minimum. On the other hand if during the running of the car the current in the armature and therefore in coil J has been small, the contact at G will include very little resistance in the circuit and consequently the dynamo action of the motor, when stopping, will be a maximum. Thus if the load has been such as to require a large current to keep it in motion and therefore will be prone to stop quickly by itself, the braking effort applied will be a minimum, and if the load has been such as to require only a small current to keep it in motion, the braking effort will be applied at a maximum. It is therefore possible by this means to cause the car to come to rest within the same length of travel whatever may be the load in the car or the direction in which the same is traveling. In the case illustrated, the regulating effect upon the dynamo-action of the motor is further supplemented by the fact that the current resulting from such dynamo-action is caused to flow through coils $o$ which produces a part of the grip of the brake shoes Z upon the pulley $Z^2$. The coil at $p$ is similar to that which is commonly used to lift the brake shoes off the pulley when the motor is required to run and does not in any way form a part of the claims of this invention. A starting rheostat is shown at $r$ which as well as the hereinbefore referred to reversing switch $m$ is of the usual construction. $s$ are the terminals of shunt winding, $t$ are the compound windings, $u$ represents non-inductive safety coil and they are shown in the diagrammatic view of Fig. 6 in order to make the same complete and operative.

Having fully described my invention, what I claim as new and desire to secure by Letters Patent, is:—

1. An ammeter type of brake regulator connected in the armature circuit of electrically driven machinery and comprising means of controlling resistances depending upon the value of the current required to move the load.

2. In an electric device for regulating a brake and connected in the circuit supplying the current to the electric motor, the contact maker of a rheostat magneto-electrically controlled by the amount of current required to move the load and designed to include a requisite resistance in the armature circuit during the period of applying the brake for the purpose of making the dynamic action of the motor, when stopping, a minimum or a maximum to suit requirements.

3. In an electric elevator system in which the hoisting device is operated by an electric motor, the combination with the electric motor of an operative electric circuit, a brake and a brake regulating device, the latter being placed in the armature circuit of the motor and designed to act as a current controller to the latter.

In testimony that I claim the foregoing as my invention I have signed my name in presence of the subscribing witnesses this 16th day of February 1906.

FREDERIC OSMOND HUNT.

Witnesses:
FREDERICK W. LANDALE,
JOHN WILLIAM WALTON.